US008452886B2

(12) United States Patent
Lou et al.

(10) Patent No.: US 8,452,886 B2
(45) Date of Patent: May 28, 2013

(54) PEER-TO-PEER PACKET SCHEDULING ALGORITHM

(75) Inventors: Jian-guang Lou, Beijing (CN); Yusuo Hu, Beijing (CN); Qingwei Lin, Beijing (CN); Fan Li, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/328,119

(22) Filed: Dec. 4, 2008

(65) Prior Publication Data

US 2010/0146136 A1 Jun. 10, 2010

(51) Int. Cl.
*G06F 15/16* (2006.01)

(52) U.S. Cl.
USPC ........... 709/231; 709/232; 709/236; 709/237; 709/238

(58) Field of Classification Search
USPC ......... 709/223, 224, 225, 227, 228, 231–234; 370/232, 230, 235, 229, 231, 233, 234, 236
See application file for complete search history.

(56) References Cited

U.S. PATENT DOCUMENTS

| | | | |
|---|---|---|---|
| 7,174,385 B2 | 2/2007 | Li | |
| 7,779,088 B2 * | 8/2010 | Boyd et al. | 709/219 |
| 7,969,997 B1 * | 6/2011 | Noh et al. | 370/408 |
| 2002/0087716 A1 * | 7/2002 | Mustafa | 709/236 |
| 2005/0187942 A1 * | 8/2005 | Dutta et al. | 707/10 |
| 2007/0094405 A1 | 4/2007 | Zhang | |
| 2008/0037527 A1 * | 2/2008 | Chan et al. | 370/353 |
| 2008/0059631 A1 * | 3/2008 | Bergstrom et al. | 709/224 |
| 2008/0112315 A1 * | 5/2008 | Hu et al. | 370/230 |
| 2008/0133767 A1 * | 6/2008 | Birrer et al. | 709/231 |
| 2008/0155120 A1 | 6/2008 | Argawal et al. | |
| 2009/0037968 A1 * | 2/2009 | Liu et al. | 725/114 |
| 2009/0083433 A1 * | 3/2009 | Liu | 709/231 |
| 2009/0097825 A1 * | 4/2009 | Harris | 386/124 |
| 2009/0164615 A1 * | 6/2009 | Akkanen | 709/223 |
| 2010/0030909 A1 * | 2/2010 | Magharei et al. | 709/231 |
| 2010/0138511 A1 * | 6/2010 | Guo et al. | 709/207 |

FOREIGN PATENT DOCUMENTS

| | | | |
|---|---|---|---|
| WO | WO2007147320 | | 12/2007 |
| WO | WO2008066516 | * | 6/2008 |

OTHER PUBLICATIONS

Hei, et al., "IPTV over P2P Streaming Networks: the Mesh-pull Approach", retrieved on Oct. 23, 2008 at <<http://cis.poly.edu/~heixj/publication/mesh-pull-p2p-streaming.pdf>>, IEEE Communications Magazine, vol. 46, No. 2, 2008, pp. 86-92.

Hoong, et al., "A Two-layer Super-Peer based P2P Live Media Streaming System", retrieved on Oct. 23, 2008 at <<http://www.matlab.nitech.ac.jp/~matsuo/JCIT07.pdf>>, Journal of Convergence Information Technology, vol. 2, No. 3, 2007, pp. 38-47.

Li, et al., "Towards Low-Redundancy Push-Pull P2P Live Streaming", retrieved on Oct. 23, 2008 at <<http://conferences.sigcomm.org/sigcomm/2008/papers/p533-liA.pdf>>, ACM SIGCOMM 08 (978-1-60558-175-0/08/08), 2008, pp. 533.

(Continued)

*Primary Examiner* — Dhairya A Patel
(74) *Attorney, Agent, or Firm* — Lee & Hayes, PLLC (57) ABSTRACT

Techniques for streaming media packets in a peer-to-peer network are disclosed.

12 Claims, 8 Drawing Sheets

OTHER PUBLICATIONS

Magharei, et al., "Prime: Peer-to-Peer Receiver-driven MEsh-based Streaming", retrieved on Oct. 23, 2008 at <<http://wwwx.cs.unc.edu/~kmp/comp832-s08/readings/rejaie-infocom2007.pdf>>, IEEE INFOCOM (0743-166X/07), 2007, pp. 1415-1423, IEEE INFOCOM 2007.

Zhang, et al., "CoolStreaming-DONet: A Data-Driven Overlay Network for Efficient Live Media Streaming", retrieved on Oct. 23, 2008 at <<http://www.cs.sfu.ca/~jcliu/Papers/CoolStreaming.pdf>>, IEEE INFOCOM 2005, vol. 3, 2005, pp. 2102-2111.

Zhang, et al., "On Large Scale Peer-To-Peer Live Video Distribution: CoolStreaming and Its Prelimianry Experimental Results", retrieved on Oct. 23, 2008 at <<http://www.cs.sfu.ca/~jcliu/Papers/CoolStreaming-mmsp.pdf>>, IEEE MMSP, 2005, pp. 1-4.

Zhang, et al., "Understanding the Power of Pull-based Streaming Protocol: Can We Do Better?", retrieved on Oct. 23, 2008 at <<http://ieeexplore.ieee.org/xpls/abs_all.jsp?arnumber=4395127>>, IEEE JSAC (0733-8716/07), vol. 25, No. 9, 2007, pp. 1678-1694.

* cited by examiner

PEER-TO-PEER PACKET SCHEDULING ALGORITHM

BACKGROUND

Servers on the Internet may use Unicast techniques to stream media to clients, where each media streaming client may establish a separate data channel with the server to receive an identical copy of the original media stream. When the number of media streaming clients increases, the bandwidth of the server may be exhausted. Therefore, such a transmission scheme may not be scalable and cannot support large scale video services or applications To avoid the drawbacks of the client-server model, peer-to-peer technology (P2P) technology may be employed, which can be more robust and more efficient than the pure client-server model. The basic idea of P2P networks is to allow each peer node to assist the server (e.g. media server) in distributing data (e.g. streaming media). A client in a P2P system may not only consume data (e.g. video data) through its download bandwidth, but may share its video data to other peers through its uploading bandwidth.

In certain cases, more than 60% of network traffic over the current Internet may be P2P, with approximately 60% of P2P traffic being video. For last-mile providers, P2P may comprise more than 80% of their traffic. P2P networking is a promising method for delivering video streams to a large scale of peers over the Internet without extra server bandwidth.

Receiver-driven scheduling algorithms (e.g. pull-based packing scheduling algorithm) are employed by most P2P streaming systems, wherein receivers decide which media packets or sub-streams are subscribed to. Furthermore, many P2P users are asymmetric digital subscriber line (ADSL) users whose uploading bandwidth is often smaller than their downloading bandwidth. A key problem of a P2P streaming system is the design of a receiver-driven scheduling algorithm to fully utilize the available bandwidth of the asymmetric peers. Therefore, there remains a need to improve a receiver-driven scheduling algorithm in a P2P streaming system.

SUMMARY

This summary is provided to introduce concepts relating to remote auto provisioning and publication of applications. These concepts are further described below in the detailed description. The presented summary is not intended to identify essential features of the claimed subject matter, nor is it intended for use in determining the scope of the claimed subject matter.

A peer-to-peer media streaming scheduling algorithm is described. The algorithm comprises 4 steps: 1) link analysis; 2) packet prioritizing; 3) request assignment; and 4) pull message. Based on this algorithm, a method to estimate the bandwidth budget; a hybrid strategy for requesting ordering; and a resource ratio based request assignment method are presented.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed to techniques for sharing a media stream (or a portion thereof) from one node to a differing node of a peer-to-peer (P2P) network.

Streaming Media Model

In general, streaming media includes a stream of packets that are decoded and rendered as they arrive at a destination (e.g. client, peer, etc.). Each packet of the streaming media may have a unique sequence number which is assigned by a hosting program, and the sequence number is used as an index of the video packet. Furthermore, the streaming media may be divided into P strips, and a packet with sequence numbers belongs to the strip (s mod P).

Transmission System

Figure 1:
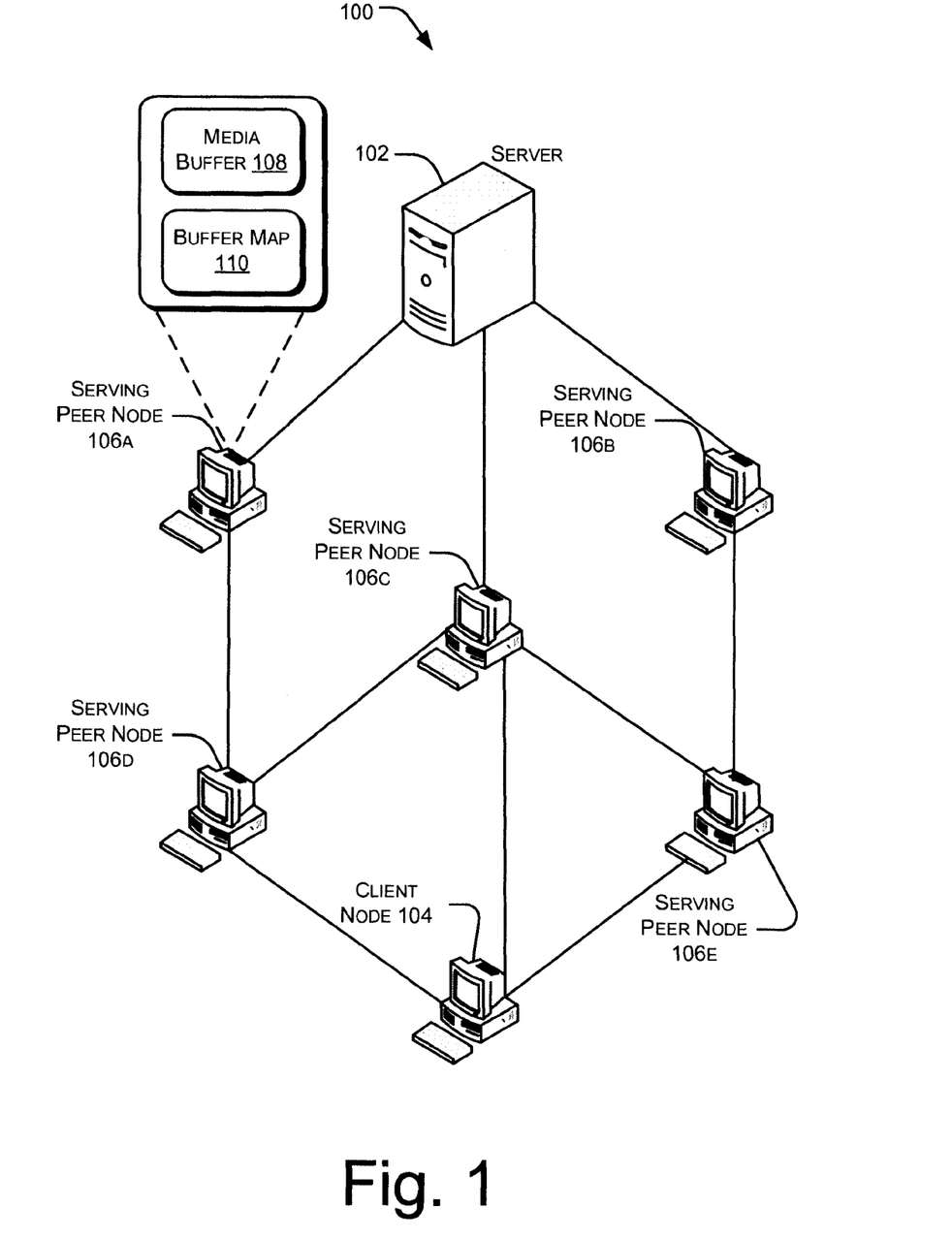
FIG. 1 is a block diagram illustrating a peer-to-peer network.

FIG. 1 shows a P2P network 100. P2P network 100 includes a server 102, client node 104, and serving peer nodes 106a-106e, where serving peer nodes 106a-106e may be collectively referred to as serving peer node 106. Server 102 is a node in P2P network 100 that originates streaming media that is to be transferred to client node 104 and serving peer nodes 106; client node 104 requests the streaming media; and serving peer nodes 106 sends a complete or partial copy of the streaming media to client node 104.

In an implementation, server 102, client node 104, and serving peer nodes 106 are all end-user nodes connected to a network, such as the Internet. Further, it should be noted that nodes of P2P system 100 (e.g. client node 104 and serving peer nodes 106) may act as a client node in a particular streaming session (e.g. requesting the streaming media) while acting as a serving peer node in a differing streaming session (e.g. sending a complete or partial copy of the streaming media). Also, any node of P2P system 100 (e.g. client node 104 and serving peer nodes 106) may simultaneously act as both a client node and a serving peer node to simultaneously stream one or more media files, or portions of media files, while receiving other streaming media from one or more serving peer nodes 106.

Client nodes 104 and peer serving nodes 106 each may include a media buffer 108 and a buffer map 110. Media buffer 108 includes a first-in-first-out (FIFO) packet queue to accommodate received packets of the media stream. The packet queue has a fixed size L, and in an example, has a size of 2048. If media buffer 108 is full, the oldest packet is removed as a new packet arrives. Buffer map 110 is a bit vector, and in one implementation, has a size of L/2. Each bit in buffer map 110 represents the availability of a single packet in media buffer 108. Given the start sequence number and buffer map 110, it may be determined which media packets are available in its packet queue. During streaming, client node 104 and serving peer nodes 106 periodically publishes their buffer map 110 to remaining nodes of P2P system 100. Based on the exchange of buffer maps 110, client node 104 knows which packets can be fetched from serving peer nodes 106.

P2P Streaming Technique

Figure 2:
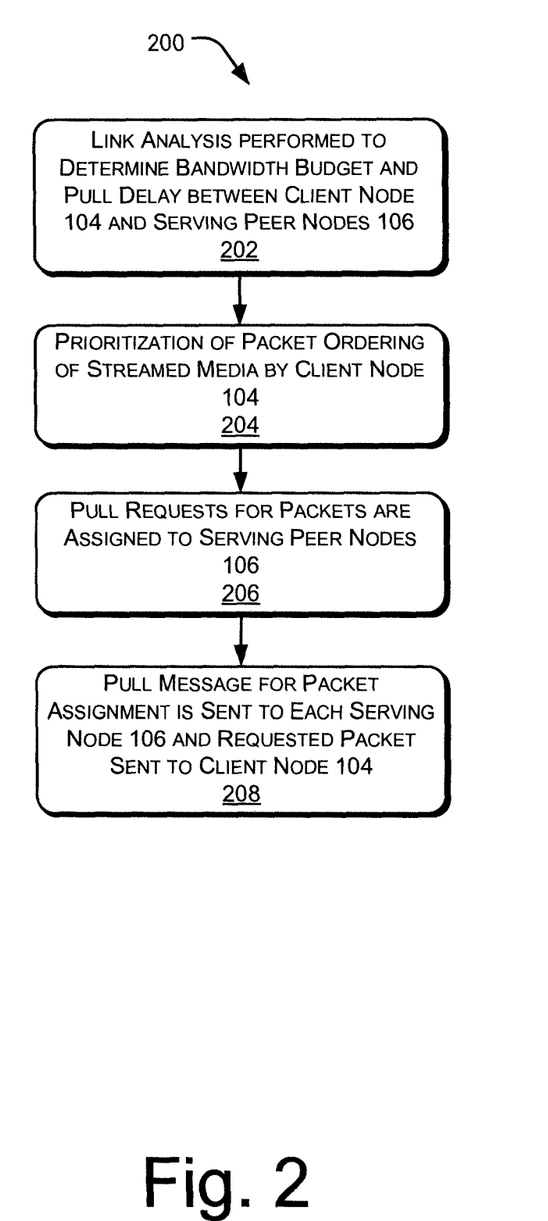
FIG. 2 is a flowchart illustrating a process of employing a pull-based algorithm in the peer-to-peer network of FIG. 1.

FIG. 2 shows an overview of a process 200 of employing a pull-based algorithm of the present disclosure. At step 202, a link analysis is performed to determine a bandwidth budget and latency between client node 104 and serving peer nodes 106. At step 204, prioritization of the packet requests of the streamed media by client node 104 is performed. At step 206, pull requests for the packets are assigned to serving peer nodes 106. At step 208, a pull message for the packet assignment is sent to each serving peer node 106 and the requested packet is sent to client node 104. Process 200 runs periodically with an interval of a fixed time period (e.g. every 2 seconds). Process 200 is described more fully below.

Link Analysis—Step 202

At step 202 of FIG. 2, client node 104 determines an available bandwidth of each of serving peer nodes 106 as well as a pull delay (latency) between client node 104 and each of serving peer nodes 106. The available bandwidth is referred to as "bandwidth budget" of each of serving peer node 106. The bandwidth budget of each serving peer node 106 and the pull delay between client node 104 and each of serving peer node 106 is determined based on information of previously received packets of the streamed media by client node 104 from serving peer nodes 106.

To determine the pull delay between client node 104 and serving peer node 106, for a pulled media packet transferred from serving peer node 106 to client node 104, the timestamps are recorded of when the media packet pull request is sent from client node 104 to serving peer node 106 and when the media packet is received by client node 104.

Figure 3:
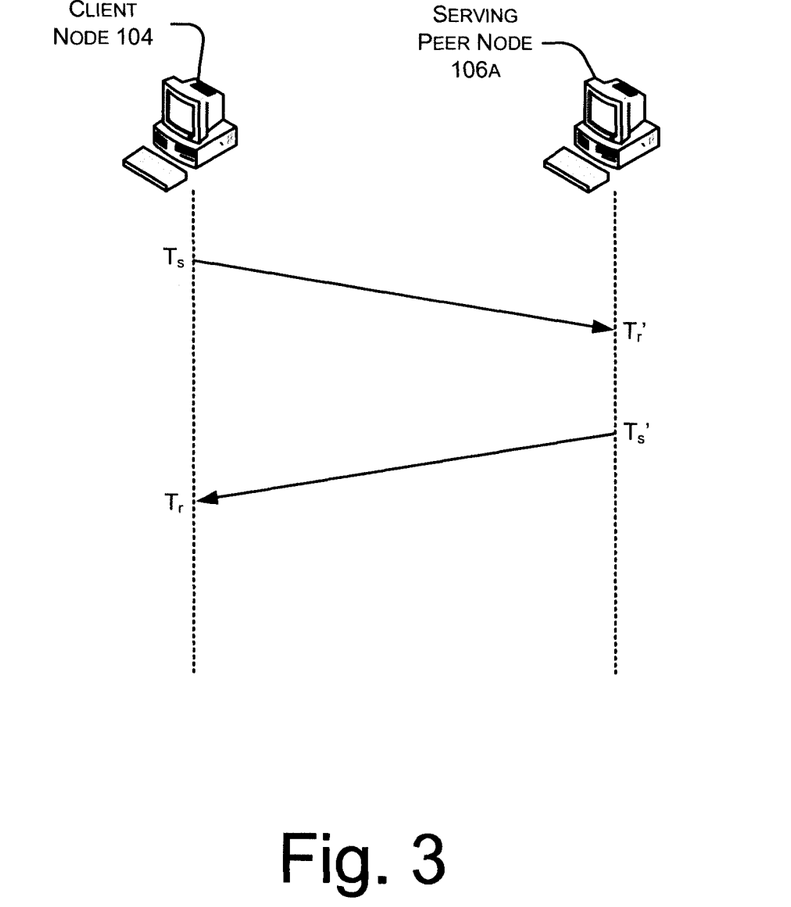
FIG. 3 is a timing diagram illustrating a pull delay between a client node and a serving peer node of the peer-to-peer network of FIG. 1.

FIG. 3 shows a timing diagram of the pull delay between client node 104 and serving peer node 106. At time $T_s$, client node 104 sends a pull request for the media packet to serving peer node 106. At time $T_{r'}$, serving peer node 106 receives the pull request for the media packet from client node 104. At time $T_{s'}$, serving peer node 104 sends the media packet to client node 104. At time $T_r$, client node 104 receives the media packet. The pull delay between client node 104 and serving peer node 10 is calculated via the following equation:

$$\tau = (T_r - T_s) - (T_{s'} - T_{r'}) \quad (1)$$

wherein $\tau$ is the pull delay. Furthermore, the average pull delay in a round of pulled processes can be obtained by averaging the pull delay of all packets received during the pull process.

To determine the bandwidth budget of serving peer 106, for each pull round, the total size of the received packets, referred to as RecBytes, and the reception of the first and last packets by client node 104, referred to as $T_{first}$ and $T_{final}$, respectively, are recorded. The average throughput $B_i$ of the ith pull round is calculated via the following equation:

$$B_i = \frac{RecBytes}{T_{last} - T_{first}} f(\tau) \quad (2)$$

wherein $\tau_i$ is the average pull delay and $f(\tau_i)$ is a function of $\tau_i$ that satisfies the equation:

$$f(\tau_i) \leq 1.0 \quad (3)$$

In a further implementation, $f(\tau_i)$ satisfies the following equation:

$$f(\tau_i) = \min\left(1.0, \left(\frac{T_a}{\tau_i}\right)^2\right) \quad (4)$$

wherein $T_a$ is an empirical value.

To that end, an estimated bandwidth budget of serving peer 106 is smoothen over time via the equation:

$$B'_i = \alpha B'_{i-1} + (1-\alpha) B_i \quad (5)$$

where $\alpha$ is a forgetting factor that $0 < \alpha < 1.0$.

Packet Ordering—Step 204

At step 204 of FIG. 2, client node 104 determines a priority of order of reception of packets from serving peer nodes 106. More specifically, client node 104 may not have an incoming bandwidth budget large enough to pull all absent packets from serving peer nodes 106 in a single pull round. As a result, the order in which the packets are pulled from serving peer nodes 106 are assigned a prioritization based on the following conditions:

serving peer nodes 106 contribute their respective uploading bandwidths as large as possible;

the playback of the streaming media should be as smooth as possible, i.e. media packets should arrive earlier than the playback deadline; and minimize overall playback delay such that users can play the streaming media with a small delay and increase data sharing among nodes of P2P system 100.

Furthermore, there are two additional conditions that nodes (e.g. client node 104 and serving peer node 106) may employ to facilitate sharing packets with one another:

client node 104 obtains absent packets from serving peer nodes 106 having the absent packets in their respective media buffers 108, i.e. client node 104 and serving peer nodes 106 become complimentary to each other; and client node 104 and serving peer nodes 106 have substantially the same play back delay, thus, the overlapped region of respective media buffers 108 is large enough (e.g. >⅔ of media buffer) to obtain a high probability of data sharing.

Figure 4:
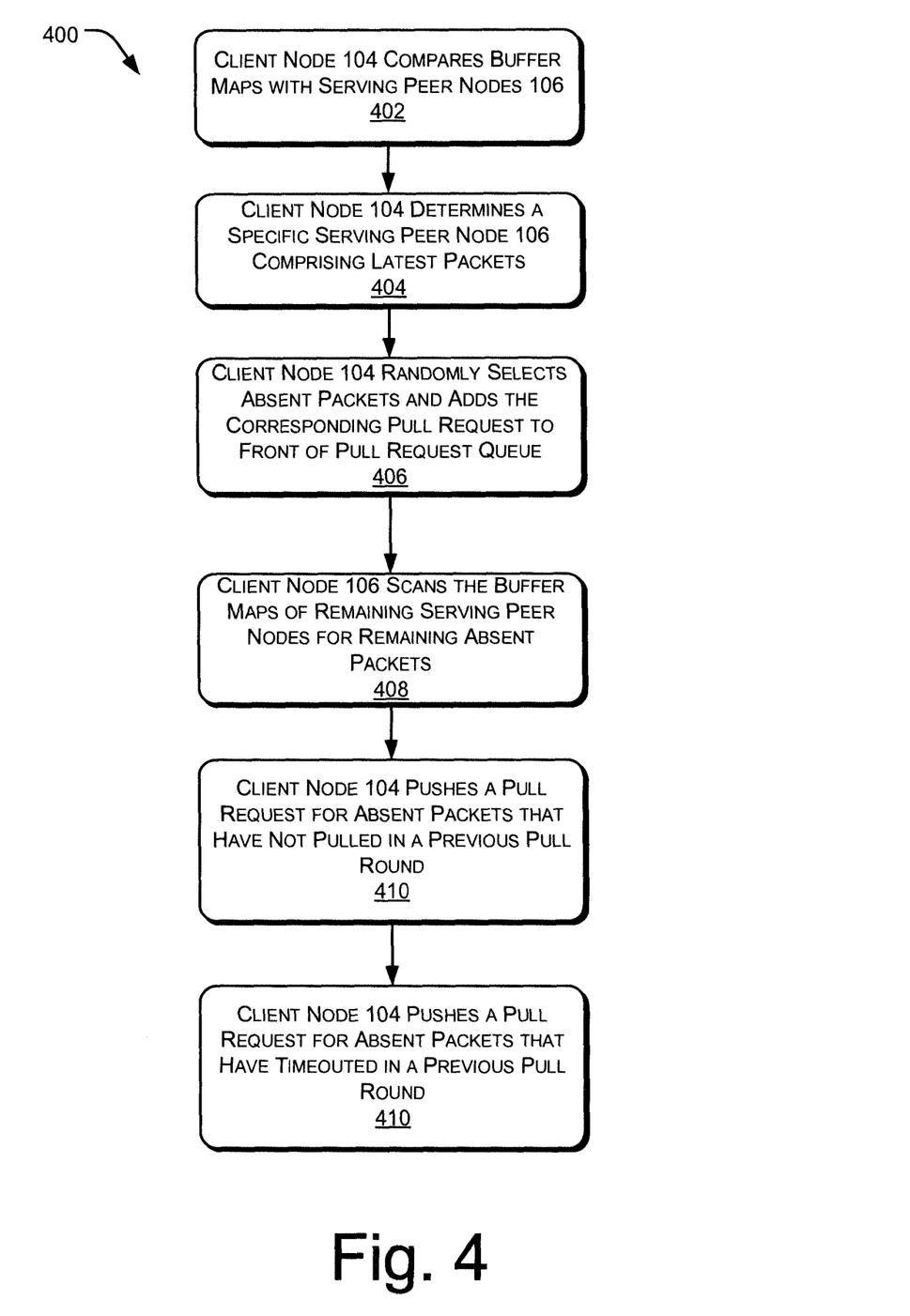
FIG. 4 is a flowchart illustrating a method of prioritizing pull requests from a client node of the peer-to-peer network of FIG. 1 employing a hybrid strategy.

FIG. 4 shows a method of prioritizing the pull requests from client node 104 employing a hybrid strategy. As mentioned above, client node 104 and each of serving peer nodes 106 comprises buffer map 108. At step 402, client node 104 compares its buffer map 108 with buffer map 108 of each of serving peer nodes 106. At step 404, client node 104 then determines a specific serving peer node 106 (serving node 106a in the present example) that comprises the latest packet with the maximum sequence number among the received buffer maps from nodes 106. At step 406, client node 104 then randomly selects a set of absent packets of client node 104 and adds the corresponding pull requests to the front of the pull request queue for serving peer node 106a. The number of randomly selected packets in the pull request from client node 104 to serving peer node 106a is calculated such that half of the bandwidth budget of serving peer node 106a is employed.

As a result of randomly pulling packets from serving peer node 106a to client node 104, the level of complementary among nodes of P2P system 100 is increased. Please note, as mentioned above, any node of P2P system 100, i.e. client node 104 and serving peer nodes 106, may act as a client node in a particular streaming session while acting as a serving peer node in a differing streaming session. Also, any node of P2P system 100, i.e. client node 104 and serving peer nodes 106, can simultaneously act as both a client node and a serving node to simultaneously stream one or more media files, or portions of media files, while receiving other streaming media from one or more serving peer nodes 106.

Further, by selecting serving peer node 106a, i.e. selecting the serving peer node 106 having the latest packet with the maximum sequence number among the received buffer maps from nodes 106 and adding the pull request for the randomly selected packets to the front of the pull request queue for serving peer node 106a, the overall delay of playback of the streaming media is minimized. Moreover, the overlapped region of media buffers 108 of client node 104 and serving peer node 106a is maximized.

At step 408, client node 104 compares its buffer map 100 with buffer maps 110 of each of the serving peer nodes 106a-106e for remaining absent packets of client node 104 in an ascending order of the packet's sequence number, (i.e., the packets needed earlier for playback of the streamed media). At step 410, if an absent packet of client node 104 has not been pulled in a previous pull round, client node 104 pushes a pull request of the absent packet to the request queue of client node 104.

At step 412, if the absent packet of client node 104 has been pulled in a previous pull round but a timeout occurred, i.e., the packet cannot be received in three times of the link pull delay, client node 104 pushes a pull request of the absent packet to the request queue of client node 104. The failed transmission of the absent packet that has been pulled in a previous pull round may have been a result of the packet being lost or not arriving in time due to network packet loss or bandwidth variance.

Request Assignment—Step 206

Figure 5:
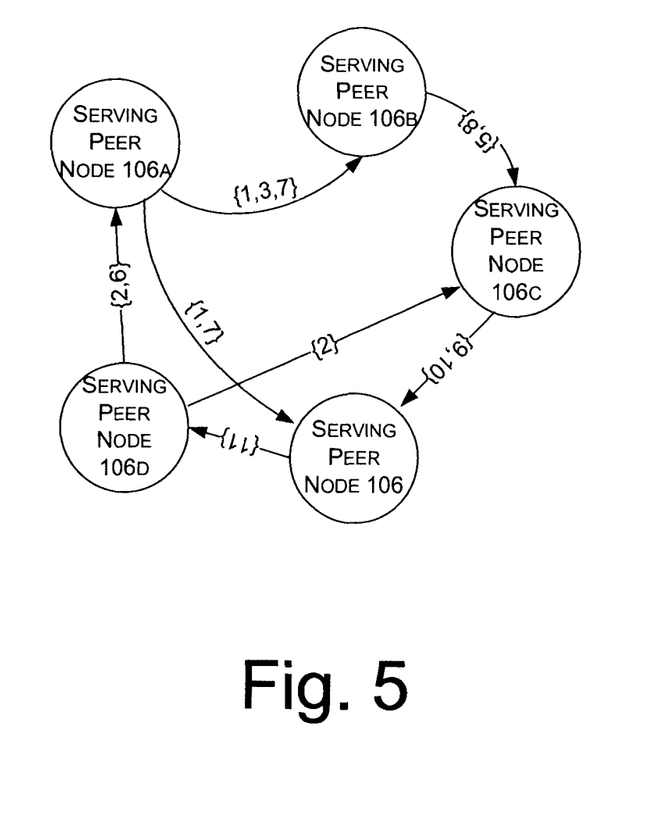
FIG. 5-6 are diagrams showing a swap graph.
Figure 6A:
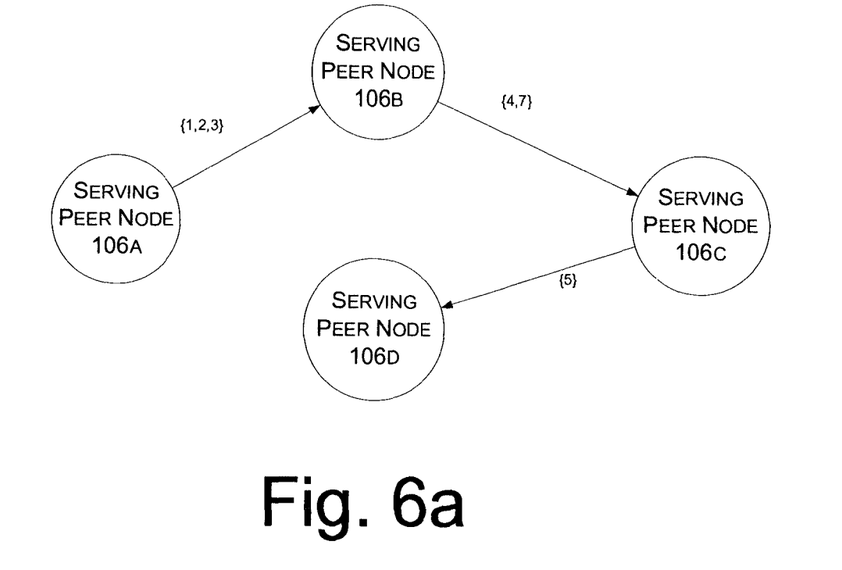
Figure 6B:
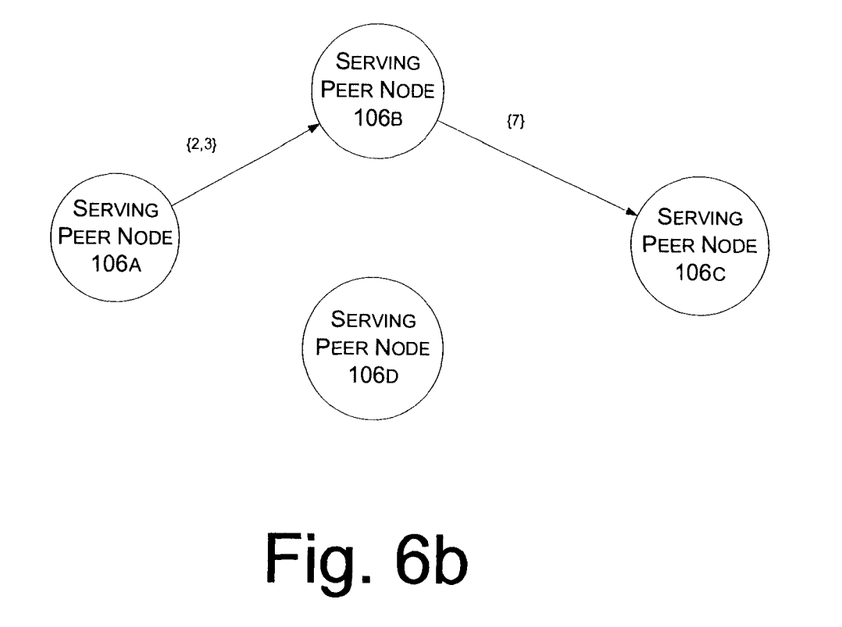

Before giving the detail of the request assignment step 206, a swap graph is shown which is used to help the calculation of the assignment algorithm. FIG. 5 gives an example of a swap graph, with the vertexes of the swap graph being the serving nodes 106 of the peer node 104. For each vertex pair $(p_u, p_v)$, $H(p_u, p_v)$ is a set of packet requests which have been assigned to peer $p_u$ and are also available in the buffer map of peer $p_v$. If $H(p_u, p_v) \neq \emptyset$, there is a directed arc from vertex $p_u$ to vertex $p_v$, and the set $H(p_u, p_v)$ is a property of the arc. Otherwise, there is no arc from $p_u$ to $p_v$. A path on the graph which does not contain loops is called as a swap path. A swap path is very useful for packet assignment process because a spare bandwidth budget can be transferred over it. For example, FIG. 6(a) is a swap path from serving peer 106a to 106d. The requests of packet 1,2,3 have been assigned to 106a, and may also be provided by 106b. Peer 106b has the requests of the packet 4 and 7 which can provided by 106c, while 106c contains a request of packet 5 which can be provided by 106d. Peer 106d is the only serving peer that has some spare bandwidth budgets. If one wants to further assign a new packet request to peer 106a, one can first let peer 106c has one spare budget by moving the request of packet 5 from 106c to 106d, then, transfer the spare budget to 106b by moving the request of packet 4 to 106c, and finally, neighbor 106a can have a spare budget for accepting the new packet request by moving the request of packet 1 to 106b. The swap path is updated to FIG. 6(b) after the budget transfer. The arc from 106c to 106d is removed due to H(C,D)=Ø. A single vertex is a trivial swap path where no budget transfer is needed.

Figure 7:
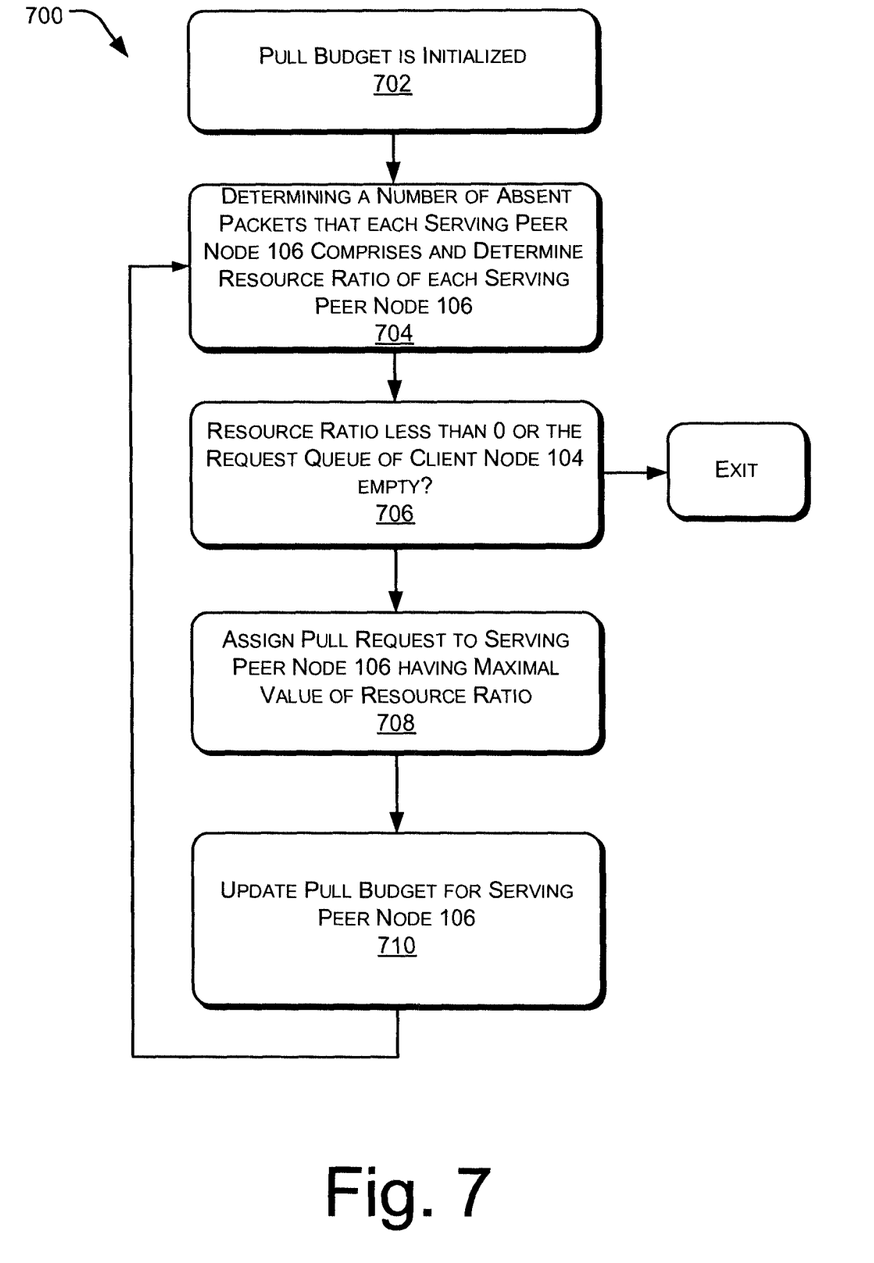
FIG. 7 is a flowchart illustrating a method of employing an algorithm for packet assignment.

To that end, at step 206 of FIG. 2, a packet assignment for each of serving peer nodes 106 is packed as a pull message request. More specifically, given the request queue of client node 104 with an ascending order of priority, client node 104 assigns each packet request to serving peer nodes 106 based upon the bandwidth budget and buffer map 108 of each of serving peer nodes 106. FIG. 7 shows a method 700 of employing an algorithm for the packet assignment.

At step 702, for each serving peer node 106 ($p_i$), a pull budget $b_i$ is initialized. The pull budget $b_i$ may be initialized as follows:

$$b_i = B'_i\left(\frac{T}{n}\right); \qquad (6)$$

wherein T is the pull interval and n is the size of the packet. The pull budget $b_i$ is based on the unit of the media packet. At the same time, a wap graph G(E,V) without any arc is created.

At step 704, for each serving peer node 106 ($p_i$), a number of the available absent packets is calculated by comparing the pull request queue with the latest received buffer map 110. The resource ratio $r_i$ of each serving peer node 106 is defined as follows:

$$r_i = \frac{b_i}{c_i}; \qquad (7)$$

wherein $c_i$ is the number of available packets from each serving peer node 106.

At step 706, if the resource ratio $r_i$ for each serving peer node 106 is less than 0, or the request queue of client node 104 is empty, the process is exited.

At step 708, for the pull request at the front of the request queue of client node 104, a subset of serving peer nodes 106 ($\{p_j\}$) is then identified that comprises the requested packet within the media buffer 106 thereof. For each serving peer 106 having a positive value of resource ratio $r_i$, a breadth-first search over the swap graph G(E,V) is used to check whether there is a swap path starting from a peer node 106 in $\{p_j\}$ to it. The check process is performed in a descending order of the peer's resource ratio. Once a swap path from 106 ($p_k$) to 106 ($p_1$) is obtained, the whole check process is terminated. If $p_1$ is a member of the set $\{p_j\}$, a trivial swap path is obtained. To that end, the pull request is assigned to a single serving peer node 106 ($p_k$), and a spare bandwidth budget is transferred along the swap path just like that depicted by FIG. 6.

At step 710, the pull budget $b_k$ for the single serving peer node 106 ($p_k$) is updated by $b_k-1$. At the same time, the arcs of the swap graph G(E,V) are also updated through re-calculating the set $H(p_u, p_v)$ The process then cycles back to step 704 to update the resource ratios $r_i$ for each serving peer node 106.

To that end, employing process 700 for requesting assignment of the pull requests to serving peer nodes 106 offers the benefit of:

the pull requests are assigned to keep load balance among serving peer nodes 106 based on their respective available bandwidth budget; and
  the utilization of the available bandwidth budget of serving peer nodes 106 is maximized.

Pull Message—Step 208

At step 208 of FIG. 2, after assigning the pull requests to serving peer nodes 106 in step 206, the pull requests are packetized as pull message request messages and sent to serving peer nodes 106. The pull request messages are a bit vector, and each bit of the pull request message represents the request of a single packet of the streamed media. Upon reception of the pull request message, each serving peer node 106 searches its media buffer 106 for the requested packets and transmits them to client node 104.

An Exemplary Computer Environment

Figure 8:
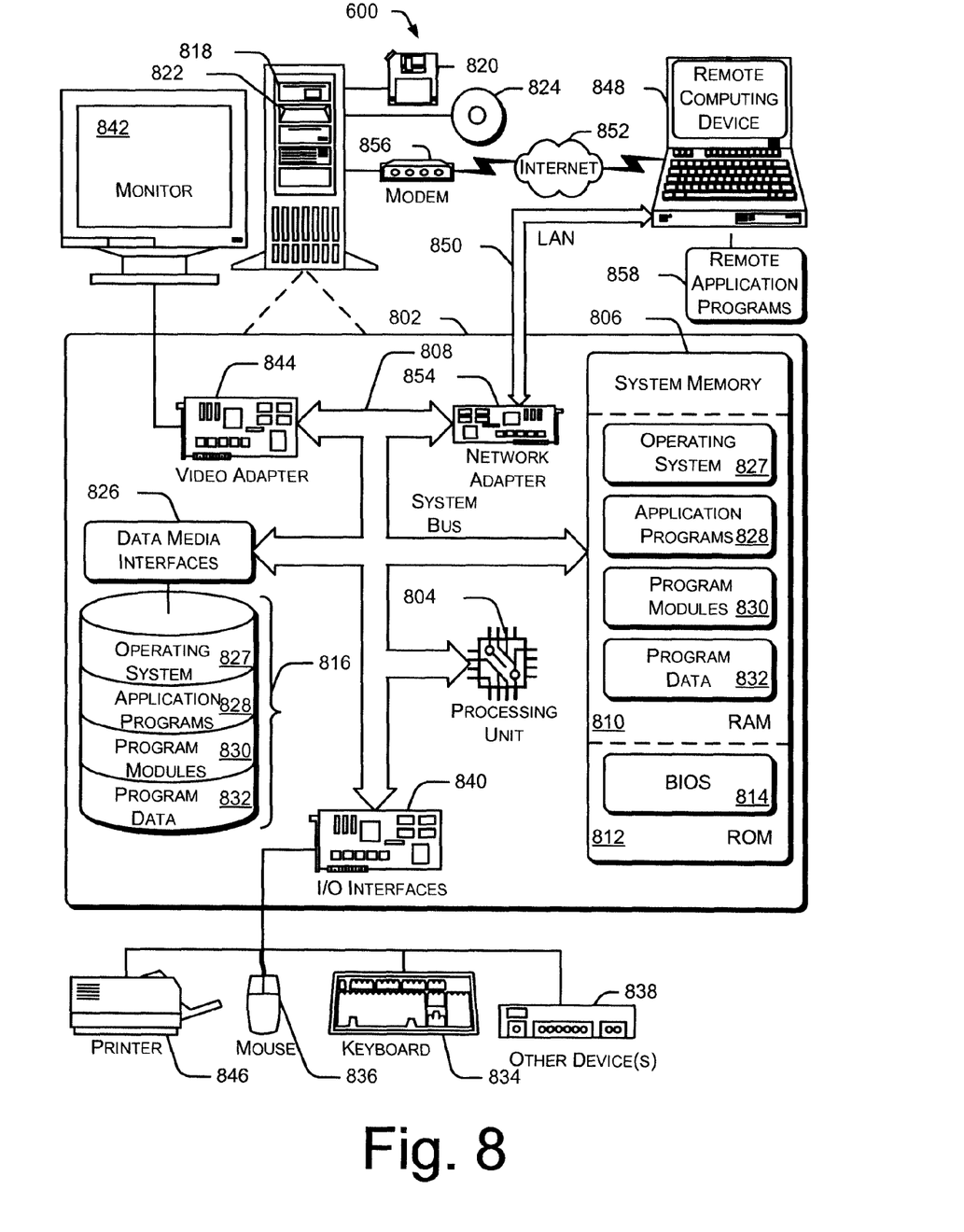
FIG. 8 is a block diagram illustrating an exemplary computing environment.

FIG. 8 illustrates an exemplary general computer environment 800, which can be used to implement the techniques described herein, and which may be representative, in whole or in part, of elements described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing-based device in the form of a computer 802. Computer 802 can be, for example, a desktop computer, a handheld computer, a notebook or laptop computer, a server computer, a game console, and so on. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812 is illustrated. RAM 810 typically contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown). Furthermore FIG. 8 illustrates a magnetic disk drive 818 for reading from and writing to a removable, non-volatile magnetic disk 820 (e.g., a "floppy disk"), additionally FIG. 8 illustrates an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternately, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more applications 828, other program modules 830, and program data 832. Each of such operating system 826, one or more applications 828, other program modules 830, and program data 832 (or some combination thereof) may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846, which can be connected to computer 802 via the input/output interfaces 840.

Computer 802 can operate in a networked environment using logical connections to one or more remote computers, such as a remote computing-based device 848. By way of example, the remote computing-based device 848 can be a personal computer, portable computer, a server, a router, a network computer, a peer device or other common network node, and the like. The remote computing-based device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote applications 858 reside on a memory device of remote computer 848. For purposes of illustration, applications and other executable program components such as the operating system are illustrated herein as discrete blocks, although it is recognized that such programs and components reside at various times in different storage components of the computing-based device 802, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations for providing remote auto provisioning and publication of applications.

What is claimed is:

1. One or more memory devices including computer readable instruction that, when executed, perform a method comprising:

identifying, at a client node, a plurality of media packets that are absent from the client node;

identifying a plurality of serving peer nodes comprising the identified plurality of media packets that are absent from the client node;

performing link analysis by the client node to determine a bandwidth and a pull delay between the client node and each of the plurality of serving peer nodes, wherein the pull delay is determine by an equation: pull delay=$(T_r - T_s) - (T_{s'} - T_{r'})$, wherein $T_s$ is defined as time the client node sends a pull request to a serving peer node, $T_r'$ is defined as the time the serving peer node receives the pull request, $T_s'$ is defined as the time the serving peer node sends a media packet to the client node, and $T_r$ is defined as the time the client node receives the media packet;

sending a plurality of pull requests to the identified plurality of serving peer nodes to request the identified plurality of media packets that are absent from the client node;

after the sending, identifying, at the client node, a new media packet that is absent from the client node;

determining that a first serving peer node of the identified plurality of serving peer nodes comprises the new media packet;

determining that a second serving peer node comprises a media packet of the identified plurality of media packets that has been assigned to and requested from the first serving peer node;

reassigning, to the second serving peer node, the media packet that has been assigned to and requested from the first serving peer node; and in response to the reassigning, assigning the new media packet to the first serving peer node and sending a new pull request to the first serving peer node to request the new media packet.

2. A method of prioritizing pull requests for media packets, the method comprising a hybrid strategy comprising:

comparing a buffer map of a client node with buffer maps of a plurality of serving peer nodes;

determining a serving peer node that comprises a latest media packet having a maximum sequence number among the plurality of serving peer nodes based on the buffer maps of the plurality of serving peer nodes;

randomly selecting a subset of media packets absent from the client node and assigning one or more first pull requests for the randomly selected subset of media packets to the determined serving peer node comprising the latest media packet having the maximum sequence number, wherein a number of the randomly selected subset of media packets for the determined serving peer node is calculated to utilize at least half of an uploading bandwidth currently available in the determined serving peer node;

adding the one or more first pull requests to a front of a pull request queue of the client node;

comparing the buffer map of the client node with the buffer maps of the plurality of serving peer nodes for the rest of the media packets absent from the client node in an ascending order of sequence numbers of the rest of the media packets absent from the client node;

pushing one or more second pull requests for the rest of the media packets absent from the client node to the back of the pull request queue of the client node; and pushing a pull request by the client node for absent packets of the client node that have not been transmitted as a result of a timeout in a previous pull round.

3. A method as recited in claim 2, further comprising the client node sending pull messages to the plurality of serving peer nodes.

4. One or more memory devices including computer readable instruction that, when executed, perform a method of prioritizing pull requests for media packets, the method comprising a hybrid strategy comprising:

comparing a buffer map of a client node with buffer maps of a plurality of serving peer nodes;

determining a serving peer node that comprises a latest media packet having a maximum sequence number among the plurality of serving peer nodes based on the buffer maps of the plurality of serving peer nodes;

randomly selecting a subset of media packets absent from the client node and assigning one or more first pull requests for the randomly selected subset of media packets to the determined serving peer node comprising the latest media packet having the maximum sequence number, wherein a number of the randomly selected subset of media packets for the determined serving peer node is calculated to utilize at least half of an uploading bandwidth currently available in the determined serving peer node;

adding the one or more first pull requests to a front of a pull request queue of the client node;

comparing the buffer map of the client node with the buffer maps of the plurality of serving peer nodes for the rest of the media packets absent from the client node in an ascending order of sequence numbers of the rest of the media packets absent from the client node;

pushing one or more second pull requests for the rest of the media packets absent from the client node to the back of the pull request queue of the client node; and pushing a pull request by the client node for absent packets of the client node that have not been transmitted as a result of a timeout in a previous pull round.

5. A method of assigning packet requests for media packets, the method comprising:

identifying, at a client node, a plurality of serving peer nodes having a plurality of packets that are absent from the client node;

assigning, to the identified plurality of serving peer nodes, a plurality of pull requests for the plurality of packets that are absent from the client node;

determining a resource ratio for each serving peer node of the identified plurality of serving peer nodes, the resource ratio for each serving peer node comprising a ratio between a pull budget of respective serving peer node and a number of packets of the plurality of packets that are absent from the client node and are available in the respective serving peer node, wherein the pull budget depends on an available bandwidth of the respective serving peer node;

determining a first serving peer node having a maximum resource ratio among the identified plurality of serving peer nodes;

determining that a requested packet of the plurality of requested packets that has been assigned to and requested from a second serving peer node is available in the first serving peer node having the maximum resource ratio among the plurality of serving peer nodes; and reassigning a pull request for the requested packet of the plurality of requested packets that has been assigned to and requested from the second serving peer node to the first serving peer node having the maximum resource ratio.

6. A method as recited in claim 5, further comprising determining if the resource ratio for each serving peer node is less than 0.

7. A method as recited in claim 5, further comprising determining if a request queue of the client node is empty.

8. A method as recited in claim 5, further comprising updating the pull budget for each serving peer node after reassigning the pull request, the pull budget depending on the available bandwidth of each serving peer node.

9. A method as recited in claim 5, further comprising the client node sending pull messages to the plurality of serving peer nodes.

10. One or more memory devices including computer readable instruction that, when executed, perform the method of assigning packet requests for media packets, the method comprising:

identifying, at a client node, a plurality of serving peer nodes having a plurality of packets that are absent from the client node;

assigning, to the identified plurality of serving peer nodes, a plurality of pull requests for the plurality of packets that are absent from the client node;

determining a resource ratio for each serving peer node of the identified plurality of serving peer nodes, the resource ratio for each serving peer node comprising a ratio between a pull budget of respective serving peer node and a number of packets of the plurality of packets that are absent from the client node and are available in the respective serving peer node, wherein the pull budget depends on an available bandwidth of the respective serving peer node;

determining a first serving peer node having a maximum resource ratio among the identified plurality of serving peer nodes;

determining that a requested packet of the plurality of requested packets that has been assigned to and requested from a second serving peer node is available in the first serving peer node having the maximum resource ratio among the plurality of serving peer nodes; and reassigning a pull request for the requested packet of the plurality of requested packets that has been assigned to and requested from the second serving peer node to the first serving peer node having the maximum resource ratio.

11. A method comprising:

identifying, at a client node, a plurality of media packets that are absent from the client node;

identifying a plurality of serving peer nodes comprising the identified plurality of media packets that are absent from the client node;

performing link analysis by the client node to determine a bandwidth and a pull delay between the client node and each of the plurality of serving peer nodes, wherein the pull delay is determined by an equation: pull delay $=(T_r-T_s)-(T_{s'-Tr'})$, wherein $T_s$ is defined as time the client node sends a pull request to a serving peer node, $T_r'$ is defined as the time the serving peer node receives the pull request, $T_s'$ is defined as the time the serving peer node sends a media packet to the client node, and $T_r$ is defined as the time the client node receives the media packet;

sending a plurality of pull requests to the identified plurality of serving peer nodes to request the identified plurality of media packets that are absent from the client node;

after the sending, identifying, at the client node, a new media packet that is absent from the client node;

determining that a first serving peer node of the identified plurality of serving peer nodes comprises the new media packet;

determining that a second serving peer node comprises a media packet of the identified plurality of media packets that has been assigned to and requested from the first serving peer node;

reassigning, to the second serving peer node, the media packet that has been assigned to and requested from the first serving peer node; and in response to the reassigning, assigning the new media packet to the first serving peer node and sending a new pull request to the first serving peer node to request the new media packet.

12. A method as recited in claim 11, wherein the bandwidth and the pull delay is determined based on information of previously received packets by the client node from a respective serving peer node.

* * * * *